United States Patent [19]

Boyle et al.

[11] Patent Number: 4,987,969

[45] Date of Patent: Jan. 29, 1991

[54] METHOD OF COUPLING A SEISMIC DETECTOR MODULE TO THE WALL OF A BOREHOLE AND A SONDE FOR IMPLEMENTING THE METHOD

[75] Inventors: Bruce W. Boyle, Sugar Land, Tex.; Claude Stanisiere, Clamart; Alain Delpuech, Robinson, both of France

[73] Assignee: Schlumberger Technology Corporation, New York, N.Y.

[21] Appl. No.: 483,347

[22] Filed: Feb. 20, 1990

Related U.S. Application Data

[63] Continuation of Ser. No. 231,093, Aug. 11, 1988, abandoned.

[30] Foreign Application Priority Data

Aug. 13, 1987 [FR] France ................................ 87 11526

[51] Int. Cl.⁵ .......................... G01V 1/00; G01V 1/40
[52] U.S. Cl. ..................................... 181/102; 367/911; 181/401
[58] Field of Search ........................... 181/102–106, 181/401; 367/25, 86, 911, 912

[56] References Cited

U.S. PATENT DOCUMENTS

| 2,786,987 | 3/1957 | Jolly | 367/86 |
| 3,353,622 | 11/1967 | Erickson | 181/102 |
| 3,354,983 | 11/1967 | Erickson et al. | 367/911 |
| 3,426,865 | 2/1969 | Henry | 367/911 |
| 3,454,870 | 7/1969 | Lintelman et al. | 367/911 |
| 3,883,841 | 5/1975 | Novel et al. | 181/102 |
| 4,578,785 | 3/1986 | Gelfand | 367/911 X |
| 4,686,653 | 8/1987 | Staron et al. | 367/25 |
| 4,744,438 | 5/1988 | Muzl et al. | 181/102 |
| 4,811,814 | 3/1989 | Starun et al. | 181/102 |
| 4,874,060 | 10/1989 | Guerendel et al. | 181/102 |

FOREIGN PATENT DOCUMENTS

| 0178784 | 4/1986 | European Pat. Off. | 181/104 |
| 0586410 | 12/1977 | U.S.S.R. | 181/401 |

Primary Examiner—Brian S. Steinberger
Attorney, Agent, or Firm—Clifford L. Tager; Peter Y. Lee

[57] ABSTRACT

A sonde for aquiring seismic signals in a borehole, the sonde comprising: a detector module (30) enclosing at least one seismic sensor (G); an elongate body (21) having a lateral cavity (22) suitable for receiving the detector module (30); a resilient suspension (40, 50) connecting said module to said body; and an anchor member (12, 13) disposed on the opposite side of said body to the side in which said cavity is disposed. The sonde is characterized by the fact that the resilient suspension exerts a force on said module suitable for displacing it out from the cavity and for pressing it against the wall of the borehole so as to couple it to said wall, together with means (41, 43, 51, 53, 60) which are provided to retract the module into said cavity against the force exerted by the resilient suspension.

10 Claims, 3 Drawing Sheets

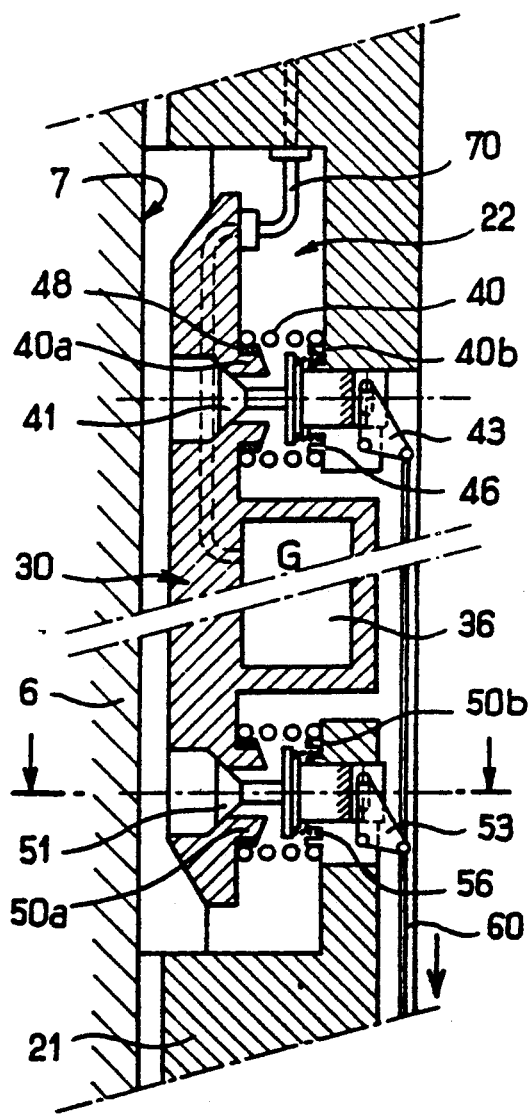
FIG_2A
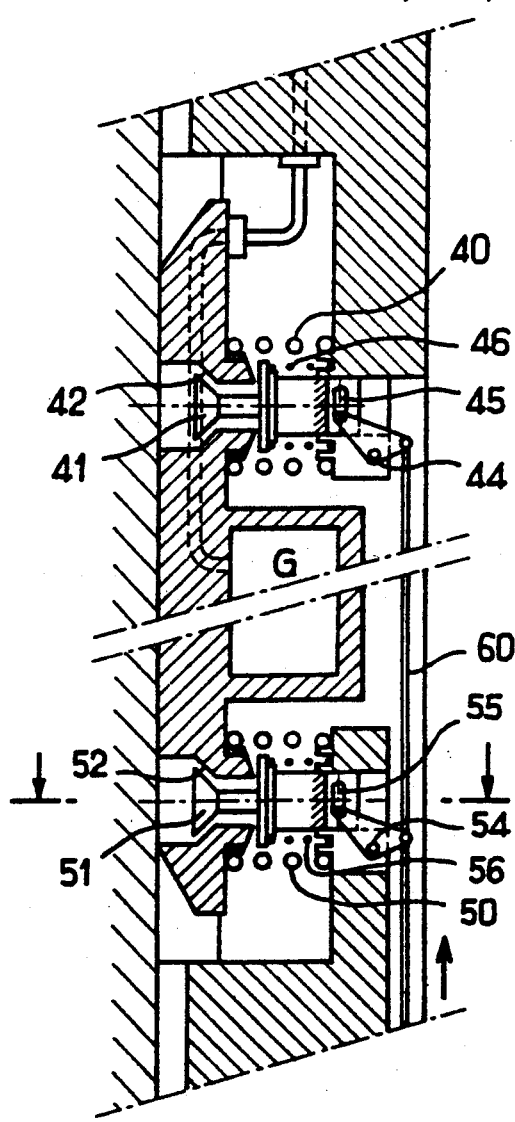
FIG_2B
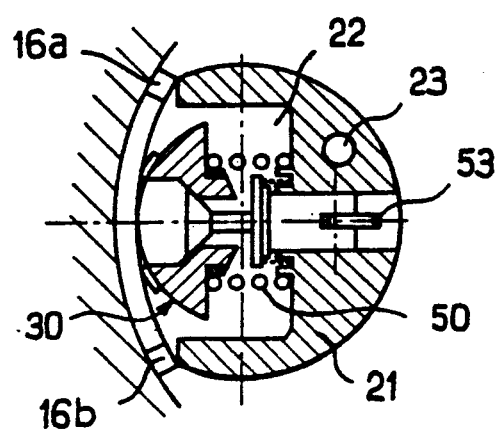
FIG_3A
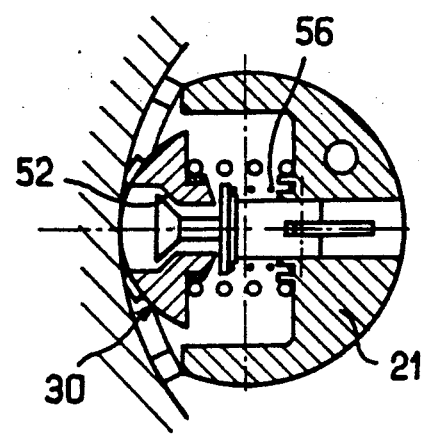
FIG_3B

METHOD OF COUPLING A SEISMIC DETECTOR MODULE TO THE WALL OF A BOREHOLE AND A SONDE FOR IMPLEMENTING THE METHOD

This application is a continuation of application Ser. No. 231,093, filed Aug. 11, 1988, now abandoned.

FIELD OF THE INVENTION

The invention relates to acquiring seismic signals in a borehole and more particularly to the method of coupling a seismic detector module to the wall of a borehole, and also to a sonde for implementing the method.

BACKGROUND OF THE INVENTION

Downhole seismic investigation consists in studying the structure of the underground geological strata on the basis of seismic signals received at various different levels in a borehole in response to a series of excitations generated by a distant seismic source. The source may be situated on the solid surface of the Earth, or else in an adjacent borehole.

The quality of the results provided by such an investigation depends to a very large extent on the quality of the seismic signals as recorded, and consequently on the quality of the coupling between the detector means and the ground, i.e. the wall of the borehole.

Investigations have shown that the body of the sonde carrying the detector means has modes of vibration which are excited during seismic emission. If the seismic detector means are rigidly connected to the body, then the vibrations to which the sonde body is subject may be communicated to the detector means, thereby affecting the quality of the recorded signals.

Patent documents FR-A-2,561,394 and FR-A-2,554,600 suggest using a resilient connection between the detector means and the sonde body. Document FR-A-2,561,394 describes a sonde having an anchor arm for pressing the sonde body against the wall of the borehole. On the side opposite to the anchor arm, the sonde body has a lateral cavity with the detector module including the seismic sensor being disposed therein. The module is connected to the sonde body by a resilient connection so as to provide a high degree of decoupling between the module and the sonde. A hydraulic actuator serves to press the module against the wall of the borehole in order to perform seismic measurements, and to retract it into the cavity while the sonde is being moved along the borehole.

The drawback of the above devices lies in the fact that it requires hydraulic actuator members which are complicated and fragile; further, these members are bulky and heavy, thereby increasing the diameter and the weight of the sonde, which is disadvantageous.

SUMMARY OF THE INVENTION

The present invention seeks to improve and simplify coupling the detector module.

In a first aspect, the present invention provides a method of coupling a detector module to the wall of a borehole, the module being disposed inside a lateral cavity provided in a sonde suspended from a cable, and said module being connected to said sonde via a resilient suspension. The method consists in:

holding the sonde stationary by pressing the face of the sonde which includes said lateral cavity against the wall of the borehole; and pressing the module against the wall of the borehole by using a force developed by said resilient suspension.

In a second aspect, the present invention provides a sonde for acquiring seismic signals in a borehole, the sonde comprising:

a detector module enclosing at least one seismic sensor;

an elongate body having a lateral cavity suitable for receiving the detector module;

a resilient suspension connecting said module to said body; and an anchor member disposed on the opposite side of said body to the side in which said cavity is disposed.

A sonde according to the invention is characterized by the fact that the resilient suspension exerts a force on said module suitable for displacing it out from the cavity and for pressing it against the wall of the borehole so as to couple it to said wall, together with means which are provided to retract the module into said cavity against the force exerted by the resilient suspension.

Preferably, the resilient suspension comprises two helical springs.

In a first embodiment, the means for retracting the module into said cavity comprise two actuators disposed concentrically with the helical springs. The retraction actuators are actuated simultaneously by the translation motion of a rod or a cable which is connected to both actuators via cranks which are pivotably mounted on said body.

In addition, each of the actuators is equipped with a return spring for decoupling the actuator from the module when the module is pressed against the wall of the borehole.

In a second embodiment, said means for retracting the module into said cavity comprise two rockers pivotably mounted on the body and acting as levers on inside faces of said module. The rockers are actuated simultaneously by translation movements of a rod or a cable.

Further, it is preferable to fit the sonde with three thrust elements disposed in an isosceles triangle configuration with the base of the triangle being perpendicular to the longitudinal axis of the sonde and being situated in the proximity of the detector module.

The detector module may also be fitted with three thrust elements disposed in an isosceles triangle configuration with the base of the triangle being parallel to the longitudinal axis of the sonde.

Other advantages and characteristics of the method and of the apparatus in accordance with the invention appear from reading the following detailed description made with reference to the accompanying drawings.

BRIEF DESCRIPTION OF THE DRAWINGS

FIGS. 1A and 1B are cross-sections on planes AA and BB of FIG. 1 through the sonde thrust elements, while

FIGS. 2A and 3A relate to a first embodiment and are respectively a longitudinal section and a cross-section through the entire detector section, with the detector module being retracted into the cavity in the sonde body;

FIGS. 2B and 3B correspond to FIGS. 2A and 3A, but show the detector module coupled to the wall of the borehole;

DESCRIPTION OF THE PREFERRED EMBODIMENTS

Figure 1A:
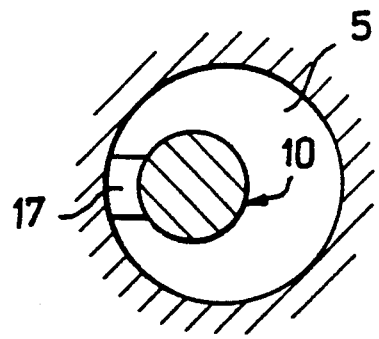
Figure 1C:
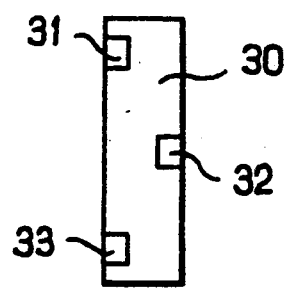
FIG. 1C is a front view of the detector module as seen along arrow F.
Figure 1B:
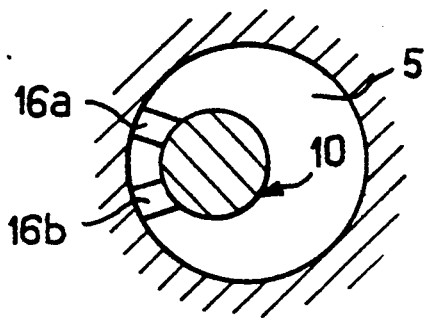
Figure 1:
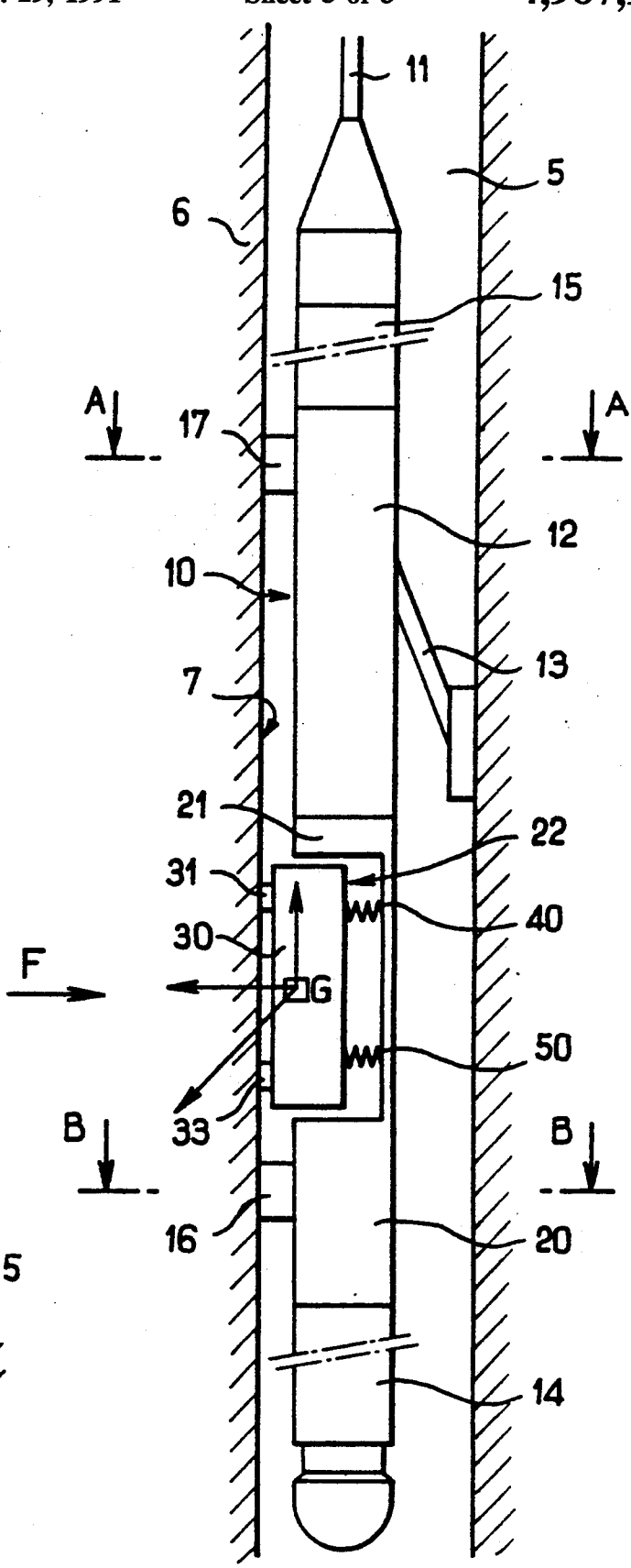
FIG. 1 is a diagram of a seismic sonde in accordance with the invention.

FIG. 1 shows a seismic sonde 10 suspended at the end of the cable 11 down a borehole 5 which passes through underground strata 6. The electric cable 11 feeds electrical power to the sonde 10 from surface equipment (not shown) together with the necessary control signals for operating it; in return, it also transmits the seismic signals detected by the sonde 10 to the surface equipment which includes, in particular, suitable recording and processing units. The sonde 10 essentially comprises four sections:

a conventional anchor section 12 which serves during a measurement state to extend an anchor arm 13 so as to fix the sonde 10 by pressing it against the wall 7 of the borehole, and which also serves to retract the arm 13 along the sonde 10 while the sonde 10 is being moved along the borehole 5;

a detector section 20 which is described in greater detail below;

an electronic section 14 for processing the control signals coming from the surface equipment and for amplifying the detected seismic signals; and a telemetry section 15 which provides an interface with the cable 11 for the purpose of exchanging digital informations with the surface equipment.

The detector section 20 comprises a body 21 having a lateral cavity 22 suitable for receiving a detector module 30 which is generally cylindrical in shape and which encloses seismic sensors G. The sensors are electromagnetic sensors or optical sensors for measuring vibration speeds, and may be disposed, for example, in a three-axis configuration. As described in greater detail below, the detector module 30 is connected to the body 21 via a resilient suspension constituted in the present example by two springs 40 and 50 having respective axes which are perpendicular to the longitudinal axis of the sonde 10.

It is preferable to fit the module 30 with thrust elements 31, 32, 33 as shown in FIG. 1C. Tests performed by the Applicant have shown that improved stiffness with respect to rotation about the longitudinal axis of the module 30 is obtained if the three thrust elements are disposed in an isosceles triangle configuration with the base of the triangle lying parallel to the longitudinal axis of the sonde 10.

The sonde 10 may itself also be fitted with thrust elements 16 and 17 so as to prevent the sonde from being unevenly pressed against the wall 7 if the wall 7 is irregular. From the point of view of vibration mechanics, it will be understood that the thrust elements 16 and 17 constitute bending mode nodes for the sonde 10; consequently, it is desirable for one of the thrust elements 16 and 17 to be situated as close as possible to the detector module 20 in order to minimize the amplitude o: vibration when the sonde 10 resonates under the effect of the incident seismic wave.

Further, in order to increase stiffness with respect to rotation about the longitudinal axis of the sonde 10, three thrust elements 16a, 16b, and 17 are provided as shown in FIGS. 1A and 1B, with said elements being disposed in an isosceles triangle configuration whose base is perpendicular to the axis of the sonde 10.

FIGS. 2A and 3A show a first embodiment of the invention and are respectively a longitudinal section and a cross-section through the detection section 20 with the detection module 30 being retracted inside the lateral cavity 22 of the body 21. FIGS. 2B and 2C are the same sections but they show the module 30 pressed against the wall 7 of the borehole.

The module 30 received in the cavity 22 includes a sealed chamber 36 suitable for receiving one or more seismic sensors. The module 30 is connected to the body 21 by a resilient suspension constituted by two helical compression springs 40 and 50 disposed between the body 21 and the module 30. The springs 40 and 50 are parallel and are disposed at a distance from each other along the longitudinal axis of the sonde. The module 30 is therefore provided with centering studs 40a and 50a on either side of the chamber 30, and the body 21 similarly includes centering studs 40b and 50b at the same distance apart as the studs 40a and 50a, with the ends of the springs 40 and 50 being located around the studs 40a, 40b, and 50a, 50b, respectively. This resilient suspension provides decoupling between the detector module 30 and the body 21.

The springs 40 and 50 have their own vibration modes which may have an effect on the module 30 during detection. In order to attenuate these effects and also to attenuate transmission of vibration from the body 21 via the springs 40 and 50 to the module 30, visco-elastic material modules are associated with each spring. This may be done in several different ways. In the example shown, rings 48 of visco-elastic material are disposed between the centering studs 40a and 50a on the module 30 and the corresponding ends of the springs 40 and 50 with the spring forces being transmitted to the module 30 via said rings 48. Another solution consists in coating the wires of the springs 40 and 50 with a visco-elastic material.

The elongate body 21 has two transverse bores passing therethrough suitable for guiding translation of two retraction actuators 41 and 51 which are coaxial with the studs 40b and 50b, respectively. The detector module 30 has two corresponding holes in its portions 40a and 50a which are aligned with the bores in the body 21 and which have tapering shoulders 42 and 52.

The retraction actuators 41 and 51 pass through the holes in the module 30 with considerable lateral clearance (e.g. 4 mm on either side) in order to prevent any lateral coupling between the actuators and the modules. Each of the retraction actuators is terminated by a flared head which is a close fit in the corresponding tapering shoulder.

The module 30 is retracted into the cavity 22 by actuating the actuators 41 and 51 in traction. These actuators then cause the flared surfaces 42 and 52 to engage the tapering shoulders 41 and 51, thereby retracting the module 30 and simultaneously compressing the springs 40 and 50.

In order to press the module 30 against the wall of a borehole, the actuators 41 and 51 are released outwardly, thereby releasing the springs 40 and 50. The springs then push the module 30 out from the cavity 22 until the module comes into abutment against the wall 7 of the borehole 5.

The resilient suspension constituted by the springs 40 and 50 has two functions: it serves firstly to support the module 30 while decoupling it from the body 21, and secondly to provide the force which presses the module 30 against the wall of the borehole.

Further, the resilient suspension does not compel the module 30 to move solely in a direction perpendicular to the axis of the sonde. The module may move away to a limited extent from its normal position (i.e. parallel to the axis of the sonde) in all directions: it may tilt relative to the sonde axis in a plane passing through said axis or in a plane perpendicular to said axis, or it may combine both types of displacement. This allows the module 30 to be applied satisfactorily against the wall even if the wall has an irregularity or slopes locally relative to the overall direction of the borehole in the portion under consideration, without thereby substantially altering the force with which the module is pressed against the wall.

The retraction actuators 41 and 51 are actuated by means of a rod 40 which is connected to two cranks 43 and 53 that pivot about axes 44 and 54 fixed to the body 21 and which cooperate with the actuators 41 and 51 via grooves 45 and 55. The longitudinal displacements of the rod 60 are thus transformed into lateral displacements of the two actuators 41 and 51.

Further, each of the retraction actuators 41 and 51 is provided with a corresponding spring 46 or 56 which, once the module 30 has been pressed against the wall of the borehole, serves to displace the flared head of the actuator from the corresponding tapering shoulder 42 or 52, thereby leaving a clearance of at least 3 to 4 mm. As a result there remains no rigid connection between the module 30 and the body 21 when the module 30 is pressed against the wall 7 of the borehole.

The rod 60 is connected to a drive member (not shown) suitable for driving it in the module retraction direction and which is under the control of the surface equipment via the remote measuring section and the electronic section. By way of illustration, the drive member may be an electric motor coupled to the rod 60 by means of a rack and pinion arrangement, or by means of a cable wound onto a pulley.

Electrical connections 70 are also provided between the module 20 and the body 21. These connections are provided via a flexible portion to minimize the mechanical coupling between the module 30 and the body 20.

The electrical cable between the electronic section 14 and the telemetry section 15 is housed in a duct 23 running longitudinally through the body 21 of the detector section 20.

Figure 5A:
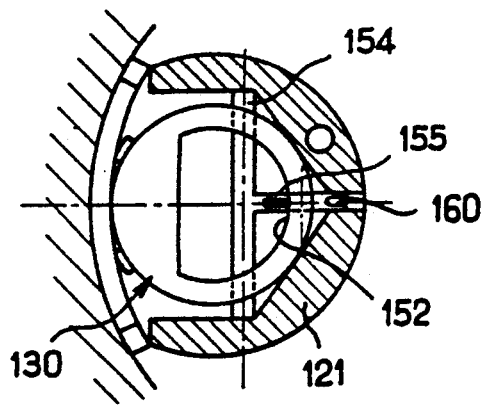
FIGS. 4A and 5A relate to a second embodiment and are respectively a longitudinal section and a cross-section of the the detector section, with the detector module being retracted inside the cavity in the sonde body.
Figure 5B:
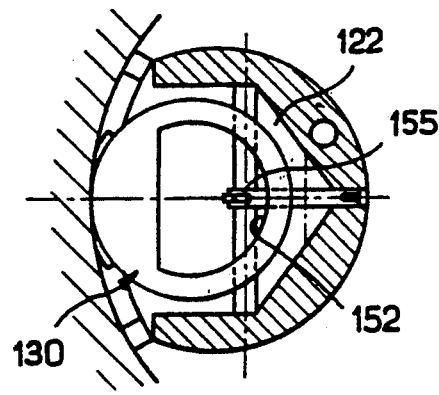
FIGS. 4B and 5B correspond to FIGS. 4A and 5A, but show the detector module coupled to the wall of the borehole.
Figure 4A:
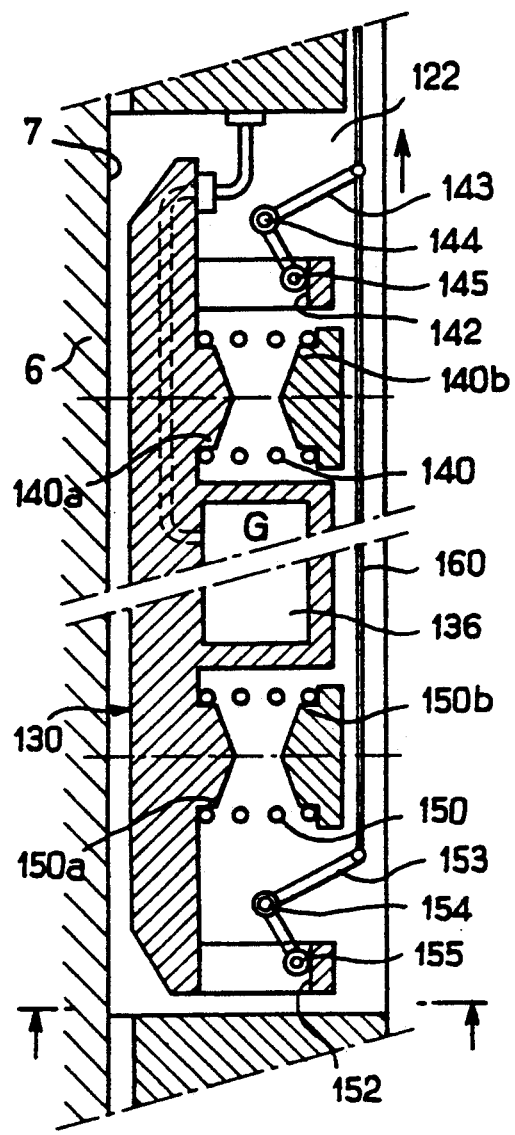
Figure 4B:
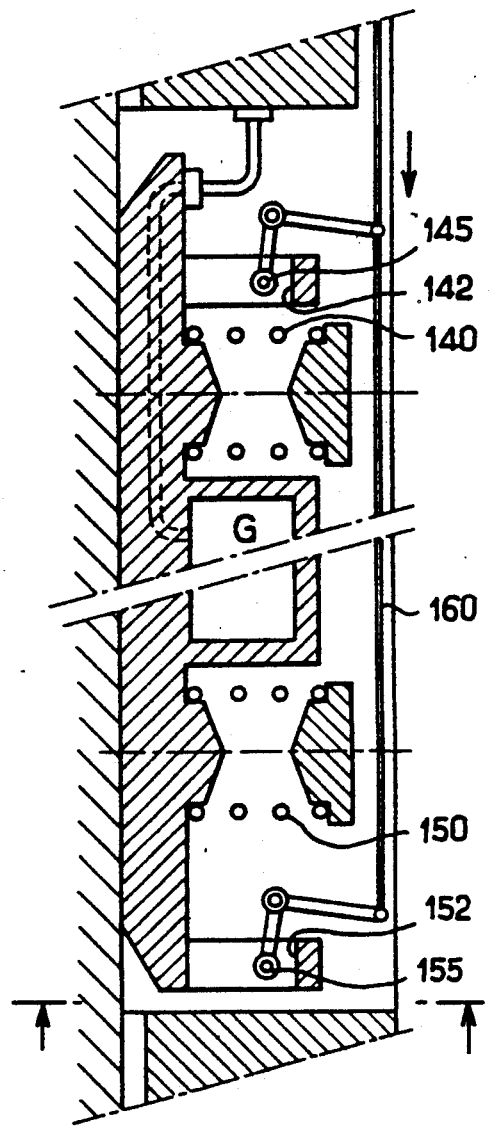

FIGS. 4A and 5A relate to a second embodiment and are respectively a longitudinal section and a cross-section through the detection section 120 with its detection module 130 retracted inside the lateral cavity 122 of the body 121. FIGS. 4B and 5B are similar sections showing the detector module 130 pressed against the wall 7 of the borehole.

In a manner similar to the first embodiment, the module 130 receives in the cavity 122 has a sealed chamber 136 suitable for receiving one or more seismic sensors. The module 130 is connected to the body 121 via a resilient suspension constituted by two helical springs 140 and 150 located on either side of the chamber 136, with centering studs 140a & 150a and 140b & 150b being provided respectively on the module 130 and on the body 121. The above-described visco-elastic elements are provided, although they are not shown.

A rod 160 is hinged to two rockers 143 and 153 which pivot respectively about axes 144 and 154 fixed to the body 121. The opposite end of each of the rockers 143 and 153 is provided with a wheel 145 or 155 which presses against an inside face 142 or 152 of the module 130.

Thus, in order to retract the module 130 into the cavity 122, it suffices to pull on the rod 160 (upwardly in FIG. 4A) so that the wheels 145 and 146 press against the corresponding inside faces 142 and 152 of the module 130. The wheels then drive the module 130 into the cavity 122 and compress the springs 140 and 150.

In order to press the module 130 against the wall of the borehole, it suffices to release the rockers 143 and 153 so that the rod moves in the opposite direction (downwardly in FIG. 4B), thereby releasing the action of the springs 140 and 150. The springs then thrust the module 130 out from the cavity 122 until the module comes into abutment against the wall 7 of the borehole 5.

Once the module 130 has been pressed against the wall 7, the rod 160 continues to move so that the wheels 145 and 155 are lifted off the inside faces 142 and 152, thereby preventing any possible coupling via the rockers 143 and 153.

The rod 160 may be connected to a conventional drive member (not shown) which provides translation movement in both directions under the control of the surface equipment.

Alternatively, the rod may be actuated by a motor solely in the direction corresponding to retraction of the module 130 against the force of the springs 140 and 150, with the transmission of drive to the rod then being possible via a cable. The displacement of the rod in the opposite direction until the module 130 comes into contact with the wall is due to the action of the springs 140 and 150 on the wheels 145 and 155. In this case, an additional spring associated with the rod should be provided in order to cause it to move beyond the position that corresponds with the module coming into contact with the wall so as to lift the wheels 145 and 155 off the faces 142 and 152 of the module.

It should be observed that the second embodiment allows for a greater stroke between the extreme positions of the module 130, with this stroke being as much as 50 mm for a sonde whose diameter is 100 mm. Typically, with a module weighing about 8 kg, the springs are chosen so that each of them provides a force going from about 600N in the retracted position to about 70N at maximum extension of 50 mm.

Naturally, the invention is not limited to the embodiments described above. The person skilled in the art can select a resilient suspension other than that described comprising two helical springs; further, the means for compressing the resilient suspension between the module and the sonde body could be constituted by any other retraction method, for example a cable fixed to the module and associated with a set of pulleys.

We claim:

1. In a logging sonde adapted for displacement in a borehole traversing an earth formation, a method of coupling a seismic detector module to the wall of a borehole in order to receive acoustic waves transmitted through the earth, the module being, while in a retracted position, disposed inside a lateral cavity provided in the sonde, the sonde being suspended from a cable, said module being resiliently connected to the sonde via spring means which acoustically isolates said module from the sonde, said sonde also comprising means for retracting including a retracting member operatively connectable to said spring means, and a translocatable member movably connected to said retracting member said method comprising the steps of:
pressing the face of sonde which includes said lateral cavity against the wall of the borehole thereby holding the sonde stationary, while maintaining said spring means in a compressed position so as to maintain said module in said retracted position;
releasing said spring means for its compressed position thereby causing said spring means to be extended, the resulting extension of said spring means causing said module to be displaced from its retracted position in said cavity into contact with the borehole wall;
maintaining said spring means in its extended position for pressing the module against the wall of the borehole, the force developed by said spring means while in its extended position being sufficient to acoustically couple said module to the borehole wall and wherein translocation of said translocation member in a first direction allows said spring means to expand and translocation in a second direction causes said retracting member to contract said spring means.

2. A method according to claim 1, wherein said spring means is held in said compressed position during displacement of the sonde along the borehole.

3. A sonde for acquiring seismic signals in a borehole traversing an earth formation, said sonde comprising:
a detector module including at least one seismic sensor;
an elongated body having a cavity disposed on one side thereof suitable for receiving said detector module while said detector module is in a retracted position and for operatively securing said detector module to said body while said detector module is in an extended position;
anchor means, disposed on another side of said body, for securing said body against the borehole wall;
spring means, connecting said module to said body, for exerting a force to displace said module from its retracted position in said cavity to its extended position to acoustically couple said detector module to the borehole wall, said spring means being adapted to acoustically isolate said detector module from said body;
means for retracting said module into said cavity against the force exerted by said spring means, said means for retracting being acoustically decoupled from said detector module when said dector module is in its extended position, and said means for retracting including a retracting member operatively connectable to said spring means, and a translocatable member movably connected to said retracting member, wherein translocation in a first direction allows said spring means to expand and translocation in a second direction causes said retracting member to contract said spring means.

4. A sonde according to claim 3, comprising three thrust elements mounted on the sonde and disposed in an isosceles triangle configuration with the base of the triangle being perpendicular to the longitudinal axis of the sonde and being situated in the proximity of said module.

5. A sonde according to claim 3, comprising three thrust elements mounted on the module and disposed in an isosceles triangle configuration with the base of the triangle being parallel to the longitudinal axis of the sonde.

6. A logging sonde for use in a borehole traversing an earth formation, said sonde for sensing acoustic waves transmitted through the earth, said sonde comprising:
a plurality of first thrust elements disposed on said sonde;
an anchor section including an anchor arm pivotally connected thereto and positioned substantially opposite said first thrust elements, said anchor section securing at least a portion of said first thrust elements against the borehole when said anchor arm is extended;
a detector section having a lateral cavity therein to receive a detector module;
a detector module, said detector module including a plurality of second thrust elements disposed thereon, said detector module further including at least one sensor to sense the acoustic waves transmitted through the formation; and
spring means, connecting said dectector module to said lateral cavity of said detector section, for securing at least a portion of said second thrust elements against the borehole when said spring means is extended, said spring means being adapted to acoustically isolate said detector module from said detector section;
means for retracting said detector module into said lateral cavity against the action of said spring means, said means for retracting being acoustically decoupled form said detector module when said detector module is in its extended position, and said means for retracting including a retracting member operatively connectable to said spring means, and a translocatable member movably connected to said retracting member, wherein translocation in a first direction allows said spring means to expand and translocation in a second direction causes said retracting member to contract said spring means.

7. The sonde according to claim 6, said plurality of first thrust elements comprising three elements disposed in an isosceles triangle whose base is perpendicular to the longitudinal axis of said sonde.

8. The sonde according to claim 6, said plurality of second thrust elements comprising three elements disposed in an isosceles triangle whose base is parallel to the longitudinal axis of said sonde.

9. A logging sonde for use in a borehole traversing an earth formation, said sonde for sensing acoustic waves transmitted through the earth, said sonde comprising:
a detector section having a lateral cavity therein to receive a detector module while said detector module is in a retracted position and for operatively securing said detector module to said cavity while said detector module is in an extended position;
an anchor section disposed on the opposite side of said body as the side in which said cavity is disposed, said anchor section for securing the portion of the sonde having said lateral cavity against the borehole wall;
a detector module, said detector module including at least one sensor to sense the acoustic waves transmitted through the formation;
spring means connecting said detector module to said lateral cavity of said detector section, said spring means exerting a force for displacing said detector module from its retracted position in said cavity to its extended position, thereby securing at least a portion of said detector module against the borehole, said spring means being adapted to acoustically isolate said detector module from any other portion of sonde;

means for retracting said detector module to said retracted position against the action of said spring mean, said means for retracting being acoustically decoupled from said detector module when said detector module is in its extended position, and said means for retracting including a retracting member operatively connectable to said spring means, and a translocatable member movably connected to said retracting member, wherein translocation in a first direction allows said spring means to expand the translocation in a second direction causes said retracting member to contract said spring means.

10. A sonde for acquiring seismic signals in a borehole traversing an earth formation, said sonde comprising:

a detector module including at least one seismic sensor;

an elongated body having a cavity disposed on one side thereof adapted for receiving at least a portion of said detector module while said detector module is in a retracted position;

anchor means, disposed on another side of said body, for securing said body to the borehole wall;

spring means for connecting said module to said body and for resiliently forcing said module away from said cavity, while said detector module is in an extended position, to contact and acoustically couple the borehole wall, said spring means providing the sole acoustic coupling between said detector module and said body while said detector module is in said extended position;

retraction means for retracting said module into said cavity against the force exerted by said spring means, said means for retracting being acoustically decoupled from said detector module when said detector module is in its extended position, and said means for retracting including a retracting member operatively connectable to said spring means, and a translocatable member movably connected to said retracting member, wherein translocation in a first direction allow said spring means to expand and translocation in a second direction causes said retracting member to contract said spring means.

* * * * *